Nov. 15, 1960  A. G. BODINE, JR  2,959,805
SUCTION CLEANER WITH BEATER ACTION AND VIBRATION ISOLATOR
Filed Oct. 22, 1956
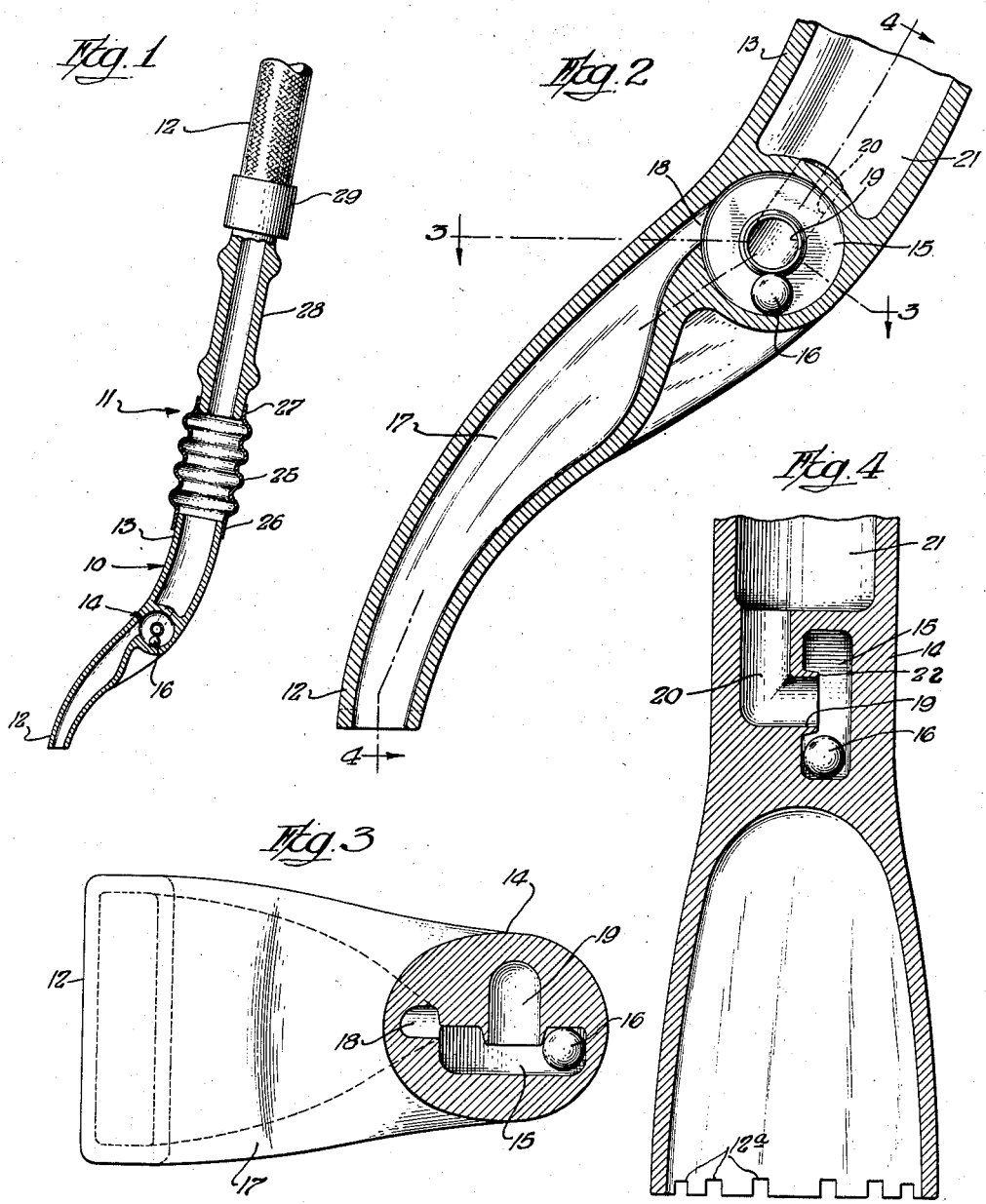
INVENTOR.
ALBERT G. BODINE, JR.
BY
ATTORNEY.

United States Patent Office 2,959,805
Patented Nov. 15, 1960

2,959,805

SUCTION CLEANER WITH BEATER ACTION AND VIBRATION ISOLATOR

Albert G. Bodine, Jr., 13120 Moorpark St., Van Nuys, Calif.

Filed Oct. 22, 1956, Ser. No. 617,487

5 Claims. (Cl. 15—379)

This invention relates generally to suction cleaners, and a general object of the invention is the provision of a suction cleaner equipped at the nozzle with a vibratory device designed to afford a beater action against the carpet or other surface to be cleaned, and with a vibration isolator designed to prevent transmission of vibration into the handle, and to maximize the amplitude of vibration of the nozzle.

The nozzle of a suction cleaner may readily be equipped with a vibrator to afford a beater action against the rug. However, there are two heretofore unsolved problems, first, effective prevention of the transmission of disagreeable vibration to the handle, and second, attainment and maintenance of strong vibratory action at the nozzle. The simple interposition of a vibration absorbing cushion between the nozzle and handle does not meet the problems stated, for the reason that an ordinary vibration absorbing cushion would actively oppose the vibration of the nozzle, dissipate a substantial proportion of the available vibratory energy by damping action and would leak vibratory energy through to the handle to a material degree. The result would still be relatively feeble vibration at the nozzle, and retention of a disagreeable extent of vibration in the handle.

According to the present invention, there is provided a novel resonantly tuned vibration isolator, including both a tuned elastic member and massive inertia member, which confines the vibration to the nozzle, and at the same time contributes virtually no opposition to free nozzle vibration. The invention will be better understood from the following detailed description of a present illustrative embodiment thereof, reference being had to the accompanying drawings, in which:

Fig. 1 is a longitudinal sectional view of a typical suction cleaner equipped with an illustrative vibration isolator in accordance with the invention;

Fig. 2 is a enlarged view of the nozzle of Fig. 1;

Fig. 3 is a section taken on broken line 3—3 of Fig. 2; and

Fig. 4 is a section taken on broken line 4—4 of Fig. 2.

In the drawings numeral 10 designates generally a suction cleaner nozzle, numeral 11 a vibration isolator, and numeral 12 a flexible hose understood to be coupled to the usual suction motor, not illustrated.

Nozzle 10, which may typically be an aluminum or phenolic casting, has a more or less typical flared mouth 12, preferably notched about its periphery, as at 12a, to assure some air flow when pressed firmly against the carpet, and a tubular neck portion 13 to which is coupled the later described isolator 11. Between mouth 12 and neck 13 is interposed a vibration generating device 14, by which the entire nozzle is set into vibration, for the purpose of causing the nozzle to beat periodically against the rug, upholstery, or other surface to be cleaned. A unique vibration generator operated by the flow of air through the nozzle is here shown. It comprises a circular cavity 15 whose periphery forms a raceway for a steel inertia ball 16. The air passage 17 extending upwards from the nozzle mouth narrows to a relatively small port 18 opening tangentially into the periphery of raceway 15, the port 18 being somewhat laterally offset from the peripheral raceway of cavity 15 so as not to interfere with or interrupt the raceway. An outlet port 19 leads laterally from the center of chamber 15, and communicates with a passage 20 leading to the suction passageway 21 continuing upwards through tubular neck 13. A flange 22 within chamber 15 around port 19 guards against the possibility of ball 16 entering into port 19.

In the operation of the generator 14, the suction developed in neck 13 draws air inwardly through nozzle mouth 12, and this air entering tangentially into chamber 15 at tangential inlet nozzle or port 18 spins rapidly around chamber 15, driving inertia ball 16 so as to spin around its raceway, and thereby impart vibration to the nozzle. The speed of rotation of the ball will of course depend upon the velocity of air flow, and therefore upon the degree of suction developed. The spin frequency of the ball, i.e., the number of trips per second around the raceway, can readily be established in the range of 20 cycles to 2,000 cycles per second, assuming a degree of suction such as is conventional in suction cleaners. As will be clear, air is exhausted from the center of chamber 15 via port 19 and passage 20, and passes upwards through neck passage 21.

Vibration isolator 11, in its preferred, illustrative form, comprises a thin walled, longitudinally elastic bellows 25, preferably composed of a good elastic material, such as steel, whose structure is such that only very slight energy is dissipated by internal friction owing to cyclic deformation of the bellows. One end portion 26 of this bellows is suitably coupled to neck 13 as shown in Fig. 1. The other end portion 27 of the bellows is coupled to one end of a relatively massive tubular inertia member 28, preferably composed of steel to afford suitable mass, and this member in this case is externally formed to serve as a handle. The other end of the member 28 is coupled, by any suitable coupling device indicated at 29, to suction hose 12. The member 28 is made fairly heavy walled, and its primary function as a part of the isolator is to contribute inertia. To it is joined the handle, and the handle may be a wand extending longitudinally therefrom, or, as is here shown, the handle may be the exterior surface portion of the member 28.

In the operation of the device, the elastic bellows 25 alternately elongates and contracts in response to the longitudinal component of vibration of the nozzle, and may at the same time bend laterally in response to lateral components of vibration of the nozzle. As stated in the foregoing, for a predetermined suction (dependent, of course, upon the design of the vacuum motor), the vibration generator develops some corresponding predetermined vibration frequency. In accordance with the invention, the elastic bellows 25 is designed or selected to have a critical resonant frequency corresponding to its predetermined vibration frequency of generator 14. The bellows 25 may be designed to be critically resonant to this vibration frequency for its longitudinal mode of vibration, i.e., alternating expansion and contraction, and it may also be designed for critical resonance in lateral bending at the vibration frequency of the generator. Such critical frequency response having been provided, and the bellows being anchored at its upper end to the substantial mass of member 28, the bellows elastically vibrates in consonance with the vibration of the nozzle, the upper end of the bellows, at its point of connection with the massive member 28, standing substantially stationary. For either mode, the desired condition is expressed by the formula $$f = \sqrt{\frac{k}{m}}$$

in which $m$ is the equivalent mass of the vibrating portion of the apparatus inclusive of the bellows, $k$ is the effective spring constant for the vibration mode under consideration, i.e., longitudinal or lateral, and $f$ is the resonant frequency, or in other words the vibration frequency of the nozzle to which the bellows is to be critically responsive.

In the analysis of elastically vibratory systems, such as the present, useful resort is had to the concept of mechanical impedance, which is the ratio of cyclic peak force acting at any given point in the system to displacement velocity at that point in the system. In the present system, to attain maximal performance, the coupling point between the bellows and the nozzle should be a region of relatively low mechanical impedance, and the coupling point between the bellows and the relatively massive member 28 should be a region of relatively high mechanical impedance. These impedance conditions are attained by the described resonant "tuning" of the elastic bellows. The massive member 28 has such inertial properties that it remains firm and steady, and does not transmit material vibratory energy. In view of the consequent low or minimal displacement velocity of the coupling point between the bellows and the member 28, this coupling point is a region of high mechanical impedance. Because of the resonant tuning of the bellows to the desired vibration frequency of the nozzle, its opposite or lower end vibrates freely and easily, so that the vibration of the nozzle is substantially unopposed, and its amplitude is maximized. The coupling point between the bellows and the nozzle is, then, a region of low mechanical impedance.

In view of the described low impedance point at the coupling between the elastic bellows and the nozzle, the bellows thus offers minimal blocking impedance to the nozzle. Second, in view of the high impedance condition provided between the inertia member 28 and the bellows, minimal vibratory energy is transmitted to the member 28, thereby gaining the dual advantages of minimization of leakage of vibratory energy upwards from the bellows, and minimization of disagreeable vibration of the member 28 when serving as a handle. Under the conditions described, a relatively low powered generator, such as the one described, is enabled to vibrate the nozzle very actively, while such vibration is almost entirely isolated from the handle member 28. A very substantial nozzle vibration is thus achieved, while such vibration is at the same time prevented from running up into the handle. The described bellows 25 is an advantageous form of elastic vibratory coupling member, and when made of a material having slight internal friction, e.g., steel, or fiberglass, dissipates negligible vibratory energy.

One illustrative embodiment of the invention has now been illustrated and described, but it will be understood that the principles of the invention are broad and capable of application in various other mechanical configurations. Thus, the elastically vibratory member 25, while here shown in the convenient and advantageous form of a well-known type of thin walled elastic bellows, may take other forms, such, for example, as a straight vibratory tube, or it may have alternative forms so long as it can be resonantly tuned to the vibration frequency of the generator. Also, while I have here shown one embodiment of the invention as applied to a relatively short-handled type of suction cleaner, with the handle member serving also the function of the inertia element of the isolator, it is to be appreciated that the invention is applicable equally well to an elongated wand type of handle. In such case, the inertial or mass member 28 might form the lower end section of such wand, or such a wand might be interposed between the upper end of the inertial member 28 and the flexible hose 12. All such modifications are accordingly to be considered as falling within the scope of the broader of the following claims.

I claim:
1. In a suction cleaner, the combination of: a suction nozzle having an intake orifice, an air passage therethrough, and an air discharge port; means for vibrating said nozzle in a predetermined frequency range when the nozzle is applied to the work; a resonantly tuned vibration isolator comprising an elastically vibratory conduit mechanically coupled at one end to said vibratory nozzle around said discharge port and an inertia member joined to the other end of said conduit, said conduit being substantially dissipationless of vibratory energy, and having a resonant frequency within said predetermined frequency range, said inertia member having a mass substantially greater than that of said conduit and such as to block transmission of vibration therethrough when said conduit is vibrating at resonance, and said conduit when vibrating at resonance being freely vibratory with said nozzle at its mechanical coupling thereto, and virtually stationary at its junction with said inertia member; and handle means united to said inertia member.

2. In a suction cleaner, the combination of: a suction nozzle having an intake orifice, an air passage therethrough, and an air discharge port; means for vibrating said nozzle in a predetermined frequency range when the nozzle is applied to the work; a resonantly tuned vibration isolator comprising an elastically vibratory conduit mechanically coupled at one end to said vibratory nozzle around said discharge port and an inertia member joined to the other end of said conduit, said conduit being substantially dissipationless of vibratory energy, and having a resonant frequency within said predetermined frequency range, said inertia member having a mass substantially greater than that of said conduit and such as to block transmission of vibration therethrough when said conduit is vibrating at resonance, and said conduit when vibrating at resonance being freely vibratory with said nozzle at its mechanical coupling thereto, and virtually stationary at its junction with said inertia member; a portion of said inertia member being formed as a handle means.

3. The subject matter of claim 1, wherein said vibrating means comprises an air spin chamber in said air passage in said nozzle, a circular bearing surface in said chamber, and an inertia rotor in said chamber guided by said bearing surface for turning in an orbital path, said air passage having an inlet junction with said chamber directing a jet of air into said chamber to spin therein and to impinge on said rotor and turn it in said orbital path.

4. The subject matter of claim 1, wherein said inertia member comprises a heavy walled air conducting tube, and said elastically vibratory conduit comprises a springy thin walled air conducting tube coupled between said heavy walled tube and said nozzle.

5. The subject matter of claim 1, wherein said inertia member comprises a heavy walled air conducting tube, and said elastically vibratory conduit comprises a thin walled bellows coupled between said heavy walled tube and said nozzle.

References Cited in the file of this patent

UNITED STATES PATENTS

| | | |
|---|---|---|
| 989,958 | Frahm | Apr. 18, 1911 |
| 2,031,957 | Karlstrom | Feb. 25, 1936 |
| 2,032,756 | Karlstrom | Mar. 3, 1936 |
| 2,100,089 | Smellie | Nov. 23, 1937 |
| 2,722,194 | Hoffman | Nov. 1, 1955 |
| 2,736,393 | O'Connor | Feb. 28, 1956 |

FOREIGN PATENTS

| | | |
|---|---|---|
| 86,762 | Sweden | July 7, 1936 |
| 556,409 | Germany | Aug. 8, 1932 |